Patented Jan. 1, 1952

2,580,708

UNITED STATES PATENT OFFICE 2,580,708

ART OF MAKING BONDED ARTICLES AND COMPOSITION THEREFOR

Walter L. Wallace, Niagara Falls, and Norman P. Robie, Lewiston, N. Y., assignors to The Carborundum Company, Niagara Falls, N. Y., a corporation of Delaware No Drawing. Application April 28, 1947, Serial No. 744,516

14 Claims. (Cl. 25—156)

This invention relates to methods and compositions for making bonded shapes and particularly to methods and compositions for molding articles of ceramic bonded granular materials such as abrasive wheels and the like. It is primarily concerned with that part of the manufacture of such ceramic bonded articles which deals with the preparation and handling of the molding mixtures from which such molded articles are made, and especially pertains to the types and manner of using temporary binders in such compositions.

Inasmuch as the present invention has been found most highly adapted to the manufacture of ceramic bonded abrasive articles it will be primarily described as it has been applied to the making of products of that type.

Heretofore it has been common practice in the molding of ceramic bonded abrasive shapes to mix the abrasive particles and pulverized ceramic bonding ingredients with a small amount of a temporary binder of an adhesive nature together with sufficient water to render the entire mass damp, tacky and moldable by pressure. While such compositions provide sufficient green strength to permit handling of the molded article and are suitable for the making of many ordinary abrasive shapes, they have had many limitations. For example, it has been found extremely difficult, if not impossible, to use them in the making of (1) large bulky shapes such as pump wheel segments, (2) fine grit size abrasive polishing wheels or stones, and (3) porous abrasive wheels of low bond content where large amounts of organic fillers such as nut shell flours, wood flours and the like are used. In the pressure molding of such articles considerable difficulty has been experienced in that cracks and flaws frequently developed during the drying of the articles so that the finished products have been unsatisfactory.

In order to be fully satisfactory for the making of ceramic bonded articles such as grinding wheels and the like, and especially articles of the types enumerated above, a molding composition should comply with the following requirements:

(a) The newly molded article, prior to drying, should possess sufficient green strength to permit reasonable handling.

(b) The molded article should retain sufficient strength after drying to permit further handling when necessary.

(c) The molded composition should permit the forming of the desired molded shapes with adequately strong edges and corners.

(d) The molding mixture should not be unduly sticky or gummy so as to interfere with its introduction and even distribution in the mold.

(e) The temporary binder should preserve the plasticity of the molded article as the article is being dried until the strains are removed from the molded piece in order to prevent cracking or development of internal strains during the drying operation.

(f) The temporary binder should be sufficiently thermosetting to prevent kiln slumpage, particularly in the making of large bulky articles.

(g) The temporary binder should impart to the molding composition an ability to absorb "springback" in molding compositions containing large percentages of pore-forming materials of resilient organic nature such as nut shell flours without cracking of the molded article.

(h) The temporary binder should preferably have a low ash content so as not to unduly influence the ceramic bonding materials by acting as a flux.

(i) The temporary binder ingredients should preferably be low in cost.

(j) The temporary binder should not act in such a way as to form a hard crust on the exterior surface of the article during the drying operation.

(k) The temporary binder should provide the molding composition with plasticity throughout the normal drying range for the article.

It is an object of the present invention to provide improved molding compositions and manners of molding ceramic bonded articles which minimize or eliminate many of the disadvantages and difficulties heretofore encountered in the art. It is a further object to provide molding compositions characterized by many, if not all, of the aforementioned desirable properties.

We have discovered that greater latitude of molding operations and improved molding results can be obtained and many of the former disadvantages and difficulties of prior art molding practice in connection with the making of ceramic bonded bodies such as abrasive wheels and the like can be reduced or eliminated by the provision of molding compositions and processes wherein the molding composition is provided with a temporary binder which not only provides the molding composition with the requisite pressure-sensitivity suitable for molding and molded green strength, but also remains plastic throughout at least the greater portion of the normal drying range. Molding compositions provided in accordance with the present invention are generally non-aqueous and by reason of their organic nature and manner of using the temporary binders incorporated therein are readily introduced and distributable in the molds and compressible under pressure. In further accordance with the present invention the molding compositions are usually pre-dried after mixture to provide free-flowing, distributable granular molding compositions composed of discrete granules which are highly stable to atmospheric conditions. These results have been accomplished through the proper combinations of organic liquid and/or solid binders with liquid organic solvents and plasticizers.

Molding compositions as herein prescribed may be made with a temporary binder comprising thermoplastic and/or heat-hardenable resins, in conjunction with suitable solvents and/or plasticizers. It is to be clearly understood that one ingredient of the temporary binder can perform more than one function in the molding composition. For example, a thermoplastic resin may be used which will also act as a plasticizer, or a thermosetting resin may be included which will function as a solvent for the thermoplastic resin, or a single component may serve as a plasticizer and a solvent. Coarse grit molding compositions containing thermoplastic temporary binders alone, especially in the making of large, bulky shapes, tend to slump with the sudden application of baking temperatures. Therefore, the thermoplastic resin is often blended with a heat-hardenable resin as an ingredient of the temporary binder so that on the application of heat the heat-hardenable resin will set up before the thermoplastic resin becomes sufficiently fluid to cause the molded piece to slump.

Molding compositions of the herein-described type as prepared are in the form of moist or oily pressure-sensitive masses such that by manual squeezing they can be caused to adhere into lump form and can be used in such condition as they are thusly distributable in molds, but in accordance with the preferred practice according to the present invention the mass of material is partially pre-dried, as by passing the mass through a rotary tube drier or the like, to a point where the molding material becomes a mass of discrete granules which are relatively dry in appearance but which are sufficiently plastic and pressure-sensitive that when subjected to low pressures in the neighborhood of 200 pounds per square inch or more adhere to one another to form a shaped article of sufficient green strength to permit ordinary handling.

The resulting partially pre-dried molding composition consists of a free-flowing mass of pressure-moldable granules, the majority of which is composed of an abrasive particle or other nonplastic granular nucleus which is largely surrounded or coated with particles of the pulverized ceramic bonding material attached to the nucleus by the organic temporary binder. The solvent and/or plasticizer is so selected as to be relatively slow drying under normal atmospheric conditions so that even without partial pre-drying, the oily appearing molding mixture is highly stable as compared to the molding compositions heretofore used. Furthermore, the organic temporary binder is of such nature that even after the molding composition has been pre-dried to partially drive off the liquid wetting ingredients, it is left in a pressure-moldable condition and is highly stable to normal atmospheric conditions.

Many solid organic binders may be used, either in a powder form or as a solution, including such binders as rosin and/or various rosin derivatives, coumarone-indene resins, and the dried residue of the waste liquor from the sulphite pulp process of making paper. Thermosetting resins, such as A-stage powdered phenolic resins, are useful in making the temporary binder heat-hardenable. Solvents suitable for use in the practice of the present invention include furfural, kerosene, coal tar solvents and the like, and water may be used in conjunction with suitable plasticizers which act hygroscopically to retard the evaporation of the water. Plasticizers suitable for the present use include liquid rosin esters, liquid coumarone-indene resins, pine tars and oils, glycerine, coal tars and oils, and the like.

The ceramic molding compositions, which include as the three basic components, the nonplastic granular material such as abrasive grains, the permanent ceramic bond material in powdered form, and the temporary binder, together with such further ingredients as pore-formers and the like, are formed by mixing in a number of ways. One or all of the various constituents of the temporary binder may be in liquid form. The liquid component of the temporary binder may contain one or more of the following: solvent, plasticizer, liquid resinous material and solid resin in solution. In the preparation of molding compositions containing fine granular material the fine grains are usually tumbled with the ceramic bond and the powdered ingredients of the temporary binder, after which the liquid components of the temporary binder are added. On the other hand, in the making of coarser grit compositions the granular material is first wet with the liquid temporary binder component and then mixed with the ceramic bond and the powdered components of the temporary binder. However, many variations in the mixing procedure are possible without departing from the spirit or scope of the present invention. Although the wet, oily molding compositions as above prepared can be placed directly in the mold and thusly molded the preferred practice is to partially pre-dry the molding composition to drive off a portion of the volatiles or oily constituents leaving the composition in a more stable and readily distributable form. This is done by partially air or oven drying the molding composition in thin layers or partially drying the material by passing it through a rotary drum drier which agitates the mixture while passing heated air through it. The partially pre-dried molding composition has a suitable ratio of temporary binder to total mass with the binder containing the proper amount of low volatile plasticizer to make the mass not only distributable and granular but readily moldable under pressure.

Such pressure moldable mixtures can be further modified when desired by introducing a small amount, such as .25% by weight of the total mix, of lubricating medium such as a hydrogenated coconut oil, which coats the discrete granular material and further improves the storage and molding characteristics of the mixture.

Pressure-moldable compositions which are especially adapted for making molded bodies of finer granular material can be made with the liquid ingredient of the temporary binder serving as both the solvent and the plasticizer. When large coarse grit articles are to be molded the temporary binder is usually composed of a mixture of high melting powdered thermoplastic resin such as a cumar resin with a powdered thermosetting resin such as a phenol-formaldehyde resin together with suitable solvents and/or plasticizers compatible with both the resinous components. Molding compositions containing temporary binders of such composite nature can be oven baked with a slowly rising temperature schedule so as to harden the thermosetting resin binding component without slumping of the molded piece.

Numerous combinations of thermoplastic and/or heat-hardenable resinous materials, together with suitable plasticizers and solvents, can be employed in making molding compositions according to, and carrying out the processes of, the present invention. Such combinations include the following:

1. Pulverized rosin products of a thermoplastic resinous character which consist chiefly of highly oxidized abietic and polymerized abietic acids with smaller amounts of polyphenols, ligneous materials, terpenes and unoxidized abietic acid mixed with liquids such as furfural, pine oils, pine tar oils, α terpineol, liquid rosin esters such as methyl abietate and hydrogenated methyl abietate, liquid coumarone-indene resins and light stain oils. Typical pulverized rosin products of a thermoplastic resinous character are those known and sold under such trade-mark names as "Vinsol," "Belro," "Corex," "Melhi" and "Truline Binder." Methyl abietate and hydrogenated methyl abietate are sold on the market under the trade-mark names of "Abalyn" and "Hercolyn," respectively.

2. Pulverized coumarone-indene resins mixed with liquids such as pine oils, kerosene, methyl abietate, liquid coumarone-indene resins, furfural and high flash point naphtha.

3. Mixtures such as those set forth under heading 1 or 2 with thermosetting resins such as phenolic resins. Two specific examples are powdered coumarone-indene resin, mixed with powdered A-stage phenol-formaldehyde resin and furfural; or a powdered thermoplastic resinous by-product of rosin mixed with powdered A-stage phenol-formaldehyde resin and pine oil. A-stage soluble, fusible thermosetting phenolic resins which can be satisfactorily used in powdered form are those made according to U. S. Patent No. 1,020,593.

4. Pulverized bitumens such as gilsonite mixed with solvents and oils such as kerosene, pine oil and high flash naphtha.

5. Pulverized heat hardenable resins such as phenolic resins mixed with liquids such as furfural, furfuryl alcohol, and pine oil.

The present invention is best demonstrated and understood by a number of specific illustrative examples of molding compositions composed and used in accordance with the principles and teachings hereinabove set forth.

*Example I*

The following molding composition has been found highly satisfactory for making ceramic bonded abrasive shapes containing relatively coarse grit abrasive grains, such as grinding wheels and the like:

| | Parts by weight |
|---|---|
| 36 grit fused alumina abrasive grain | 940 |
| 46 grit fused alumina abrasive grain | 940 |
| Powdered ceramic bond | 120 |
| Powdered thermoplastic resinous derivative of rosin (derived from the solvent extraction and purification of rosin from pine tree stumps and consisting chiefly of highly oxidized abietic and polymerized abietic acids with smaller amounts of polyphenols, ligneous materials, terpenes, and unoxidized abietic acid) | 50 |

A solution composed as follows:

| | |
|---|---|
| 23 parts by weight furfural | |
| 12.5 parts by weight powdered thermoplastic resinous rosin derivative as described above | 78 |
| 37.5 parts by weight liquid coumarone-indene resin | |

The ceramic bond is composed of 80 parts by weight of a pulverized glass frit, consisting approximately by oxide analysis of 70% $SiO_2$, 20% $B_2O_3$ and 10% $Na_2O$, uniformly blended with 20 parts by weight of ball clay.

The abrasive grain and ceramic bond is dry mixed for two minutes, the solution added and mixed in for an additional 3 minutes and the powdered thermoplastic rosin derivative added last with additional mixing for 10 minutes. The resulting oily-appearing mixture is then dried for 20 minutes at 170° F. and put through a 14 mesh screen while cooling. The screened mix is then re-mixed with 4 parts by weight of a finely powdered hydrogenated coconut oil.

The above mixture is of a loose, discretely granular, free-flowing nature, is highly stable to normal atmospheric conditions and is moldable upon the application of pressure. The molded bodies do not need to be dried when the above molding composition is used in its partially pre-dried form as described above. Pulp wheel segments can be made by placing such a prepared molding mixture into a mold of the desired shape and pressing at a pressure of 1000 pounds per square inch. The resulting article is then fired at a temperature sufficient to mature the ceramic bond.

*Example II*

The following molding composition has been found satisfactory for the making of abrasive articles of finer grit size such as knife sharpeners, stones and the like:

| | Parts by weight |
|---|---|
| 280 grit size silicon carbide grain | 780 |
| 320 grit size silicon carbide abrasive grain | 780 |
| Powdered ceramic bond | 440 |
| Powdered thermoplastic resinous derivative of rosin as described in Example I | 50 |
| Pine oil | 90 |

A pine oil found suitable for carrying out the present invention is one having the specifications given below:

| | |
|---|---|
| Specific gravity at 15.6/15.6° C. | 0.9423 |
| Refractive index at 20° F. | 1.4826 |
| Unpolymerized residue | 1.1% |
| Moisture | 0.25% |

Flash point (Cleveland Open Cup) _____ 188° F.
Freezing point _____ 30.2° F.
A. S. T. M. distillation range__ 5%   212.0° C.
A. S. T. M. distillation range__ 10%  213.0° C.
A. S. T. M. distillation range__ 30%  215.3° C.
A. S. T. M. distillation range__ 50%  216.7° C.
A. S. T. M. distillation range__ 70%  217.8° C.
A. S. T. M. distillation range__ 90%  219.4° C.
A. S. T. M. distillation range__ 95%  221.3° C.

The molding composition is prepared by tumbling the dry ingredients for 30 minutes and screening them through a 100 mesh screen after which the pine oil is added followed by mixing for an additional 10 minutes. The mix is then oven dried at 200° F. for 30 minutes, cooled slightly and finally screened through a 16 mesh screen. The resulting molding composition is composed of a free-flowing mass of discrete granular material which is highly stable to normal atmospheric conditions and is pressure-sensitive and capable of being pressure-molded according to standard molding procedures.

Example III

The following molding composition is adapted for making porous ceramic bonded abrasive shapes wherein an organic pore-forming material such as crushed nut shells is used. The molding of such compositions with the aqueous, adhesive type of temporary binder heretofore employed, due to the resilience or "springback" characteristics of the dampened nut shell material during drying, has caused considerable molding difficulties which have been eliminated in compositions of the following type as practiced under the present invention:

|  | Parts by weight |
|---|---|
| 36 grit size fused alumina abrasive grain | 588 |
| 46 grit size fused alumina abrasive grain | 588 |
| 40-60 mesh size crushed nut shells | 50 |
| Powdered ceramic bond | 75 |
| 25% solution of a thermoplastic resinous derivative of rosin as described in Example I in a coumarone-indene resin | 50 |
| Furfural | 10 |

Molding compositions of the above ingredients and proportions are processed in the same manner set forth above for Example II.

Example IV

|  | Parts by weight |
|---|---|
| 36 grit size fused alumina abrasive grain | 588 |
| 46 grit size fused alumina abrasive grain | 588 |
| 40-60 grit size crushed nut shells | 50 |
| Powdered ceramic bond | 75 |
| A thermoplastic resinous derivative of rosin as described in Example I | 25 |
| Diethylene glycol ester of rosin | 20 |
| Furfural | 10 |

A molding mixture of the above composition is prepared and processed as set forth in Example II above.

Example V

|  | Parts by weight |
|---|---|
| 36 grit size fused alumina abrasive grain | 588 |
| 46 grit size fused alumina abrasive grain | 588 |
| 40-60 mesh size crushed nut shells | 50 |
| Powdered ceramic bond | 75 |
| Dried residue of sulphite pulp waste liquor | 35 |
| Glycerine | 37.5 |
| Water | 22.5 |

It is pointed out that although the above molding composition is aqueous it depends upon the hygroscopic nature of the glycerine to provide its slow-drying, plasticizing action so as to impart moldability and stability to the partially dried molding composition.

The above specific examples do not exhaust the possible molding compositions which can be made in accordance with the principles of the present invention. A great many combinations are possible and the final choice of ingredients must depend upon the availability and cost of the materials, simplicity of mixing and the properties desired. The organic temporary binder is usually introduced into the mixture with a small amount of volatile solvent which is slowly evaporated after mixing to leave a tacky, plasticizing temporary binder. The volatile solvent is conveniently removed by passing the mixture through a rotating tube drier to provide a free-flowing, loose granular mass of discrete particles. An alternative mixing procedure which has been satisfactorily used wherein the solvent can be eliminated has been the mixing of the liquid and/or powdered components of the temporary binder with the granular material, the latter being preheated prior to mixing. The temporary binder is heated by the pre-heated granular material to render the liquid temporary binder temporarily of lower viscosity and more readily miscible with the granules, and as the mixture cools slightly it is obtained in distributable, free-flowing condition without drying to remove solvent, as otherwise might be required. The resulting partially dried pressure-sensitive molding compositions differ from the conventional molding mixes heretofore used, the outstanding differences being summarized as follows:

1. The partially dried, moldable compositions are more uniform over a greater period of pressing time since they are stabilized and do not dry out appreciably while awaiting use.

2. The partially dried mold compositions as above described in making many smaller sized articles do not require additional drying after molding.

3. The partially dried, moldable mixes as above described usually require slightly greater molding pressures in order to obtain the same density as previously used, aqueous type mixes.

4. The above mixes due to their free-flowing, distributable, discretely granular nature are particularly well suited for use with automatic molding equipment wherein the supply of molding composition is held in supply hoppers and automatically released and fed into the molding equipment so as to fill the mold by automatic means.

Example VI

Grinding wheels 12" in diameter and 3½" thick with an 8" arbor hole have been made with highly satisfactory results using the following molding composition:

|  | Parts by weight |
|---|---|
| 80 mesh size fused alumina abrasive grain | 94 |
| Powdered ceramic bond | 6 |
| 60/100 mesh size crushed nut shells | 6 |
| Powdered thermoplastic resinous derivative of rosin as described in Example I | 2.3 |
| Powdered A-stage phenol-formaldehyde resin | 1.8 |
| Pine oil | 2.3 |

The above molding composition is prepared by mixing all the dry materials after which the pine oil is introduced to provide a slightly moist-appearing distributable mass or, alternatively, the abrasive grain, pulverized ceramic bond, crushed nut shells and powdered rosin derivative may be first mixed together, followed by mixing in the pine oil, with the addition of the powdered phenolic resin last.

The molding composition as above prepared, since it is readily distributable in a mold as above prepared, can be immediately placed in a mold, pressed at 1500 pounds per square inch, and the molded wheels dried for several hours at 210° F. after which they are fired at temperatures sufficient to mature the ceramic bond.

If desired, the same molding composition can be processed to a partially pre-dried condition and used in the manner described in Example I.

When molding abrasive articles using molding compositions of the above described type wherein crushed nut shells are used as the pore-forming material, the percent of the thermoplastic resin and phenolic resin, which are used in approximately the 5:4 ratio in respect to one another, and the amount of pine oil which is recommended for use with various percentages of crushed nut shells is as follows:

| Per Cent Walnut Shells | Per Cent Thermoplastic resin— Phenolic resin (5:4 Blend) | Per Cent Pine Oil |
|---|---|---|
| 0 | 2.1 | .7 |
| 1 | 2.4 | 1.8 |
| 2 | 2.7 | 1.9 |
| 4 | 3.3 | 2.1 |
| 6 | 3.9 | 2.3 |
| 8 | 4.5 | 2.5 |

*Example VII*

Large abrasive pulp wheel segments have been satisfactorily made from the following molding composition:

Parts by weight
60 grit size silicon carbide grain_____ 233.5
80 grit size silicon carbide grain_____ 156.0
100 grit size silicon carbide grain_____ 155
120 grit size silicon carbide grain_____ 78
Powdered ceramic bond_____ 127.5
Powdered thermoplastic resinous derivative of rosin_____ 13.5
Powdered A-stage phenolic resin_____ 6
Pine oil_____ 16.5

The molding composition is prepared by mixing the abrasive grain, powdered thermoplastic resin and powdered phenolic resin for two minutes in a Glen mixer which is rotated at 75 revolutions per minute. The pine oil is then added slowly while the mixer is running, the pine oil being added near the center of the mixer to avoid wetting of the sides of the mixer pan as much as possible. The mixer is then run at the same speed for an additional two minutes followed by the addition of the ceramic bond. The mixer is then stopped and the sides and paddle brushed down, the mixer re-started and operated for an additional six minutes at 75 revolutions per minute, and the mix screened through a No. 10 sieve. The resulting molding composition is in a moist, moldable condition suitable for immediate molding operations although, if desired, it can be further processed by partially drying it by passage through a rotary tube drier with constant agitation so as to obtain a dry-appearing, pressure-sensitive mass of loose granular material which is highly stable to normal atmospheric conditions and can be stored for reasonable periods of time prior to its use in molding operations. Especially when partially pre-dried the above molding composition is highly adaptable to use with automatic molding equipment. Pulp wheel segments molded of the above composition are dried, without appreciable loss due to rejection because of cracks or flaws, by oven drying for 36 hours starting at a temperature of 150° F. and ending at a temperature of 210° F. The resulting dried segments are fired at a temperature sufficient to mature the ceramic bond.

In the preparation of compositions of the above type embodying thermoplastic resins of the rosin derivative type and heat-hardenable powdered resins such as phenol-formaldehyde resins together with slow drying solvents such as pine oil several precautions must be taken to obtain most satisfactory results. One characteristic of such mixes is that the solution of the resinous materials in the pine oil takes place slowly at room temperature but more rapidly when the mix becomes warmed, thus causing the composition to become tacky and difficult to handle. For this reason the mixer should not be operated too fast or for too long a period of time nor should the abrasive grain prior to use be stored in a warm place.

Also, in molding operations embodying compositions of the herein-described type it has been found that due to the relative dryness of the molding compositions as compared to previous types of molding compositions compression in the mold does not take place as quickly as in the case of previous mixtures. For that reason it is necessary to allow more time for mold closure.

It is believed that molding compositions of the herein-described type function in the following manner. As the pine oil or other slow drying solvent is added to the powdered ingredients it slowly dissolves the resinous components of the temporary binder to provide a molding compound which is compressible although of insufficient stickiness to render the material difficult to handle or interfere to any extent with its readily distributable characteristics. Due to the resin content the initial green strength is satisfactorily high and is preserved throughout the drying period. Whereas conventional molding mixtures as heretofore used with water-soluble binders have tended to dry immediately on removal from the mold so as to form an undesirable outer crust which has interfered with the proper drying of the interior of the article, thereby developing inner strains and cracks in the molded article during the drying step, the present molding compositions eliminate this action. In the present mixtures air drying and formation of a crust is prevented almost completely because of the slow drying action of the pine oil or equivalent solvent, thereby preventing the cracking or development of strains within the molded article. When the molded shape is placed in the oven and subjected to drying temperatures the pine oil or other solvent is slowly driven off and the thermoplastic resinous component of the temporary binder, and the A-stage phenolic resins when also incorporated in the temporary binder, gradually increase in strength. At approximately 110° F. to 115° F. the pine oil starts to evaporate and it is at this point that the phenolic resin dissolves rapidly in the pine oil so as to keep the article thermoplastic until the balance of the pine oil or other solvent has been driven off. After several hours at temperatures in the neighborhood of 210° F. and after any strains due to pressing, and "springback" during heating up and drying have been relieved through the medium of the thermoplastic condition of the binder at all times, the phenolic or other thermosetting resin hardens to provide a molded shape having substantially no internal strains. The thermosetting resin is particularly effective in the molding of large pieces in preventing slumpage while the temporary binder is still in a thermoplastic condition.

Whenever reference is made herein in the specification or claims to a "thermoplastic resinous rosin derivative," it is intended to mean by the expression a thermoplastic resinous material derived from rosin and consisting chiefly of highly oxidized abietic and polymerized abietic acids with smaller amounts of polyphenols, ligneous materials, terpenes and unoxidized abietic acid. Typical rosin derivative products of a thermoplastic resinous character are those known and sold under such trade-mark names as "Vinsol," "Belro," "Corex," "Melhi" and "Truline Binder."

Having described the present invention in full detail it is desired to claim:

1. A composition for molding ceramic bonded articles comprising a distributable mass of pressure-moldable granules in which each of a majority of the individual granules comprises a non-plastic, inorganic granular nucleus largely surrounded by particles of pulverized ceramic bonding material attached to the nucleus by an organic resinous temporary binder consisting of an organic resinous plasticizing agent selected from the group consisting of thermoplastic resinous derivatives of rosin, thermoplastic coumar and indene resins, and bitumens, which organic resinous plasticizing agent is stable and non-volatile under normal atmospheric conditions and remains plastic during the early stages of drying.

2. A composition for molding ceramic bonded articles comprising a distributable mass of pressure-moldable granules in which each of a majority of the individual granules comprises a non-plastic, inorganic granular nucleus largely surrounded by particles of pulverized ceramic bonding material attached to the nucleus by an organic resinous temporary binder consisting of a thermoplastic resin selected from the group consisting of thermoplastic resinous derivatives of rosin, thermoplastic coumarone indene resins, and bitumens and a slow-drying non-aqueous solvent therefor.

3. A composition for molding ceramic bonded articles comprising a distributable mass of pressure-moldable granules in which each of a majority of the individual granules comprises a non-plastic, inorganic granular nucleus largely surrounded by particles of pulverized ceramic bonding material attached to the nucleus by an organic temporary binder consisting of a resinous rosin derivative, a thermosetting resin, and a slow-drying solvent.

4. A composition for molding ceramic bonded articles comprising a distributable mass of pressure-moldable granules in which each of a majority of the individual granules comprises a non-plastic, inorganic granular nucleus largely surrounded by particles of pulverized ceramic bonding material attached to the nucleus by an organic temporary binder consisting of a thermosetting resin, a plasticizer, and a slow-drying solvent.

5. A composition for molding ceramic bonded articles comprising a distributable mass of pressure-moldable granules in which each of a majority of the individual granules comprises a non-plastic, inorganic granular nucleus largely surrounded by particles of pulverized ceramic bonding material attached to the nucleus by an organic temporary binder consisting of a resinous rosin derivative, a phenolic resin and a pine oil solvent.

6. A non-aqueous composition for molding ceramic bonded abrasive articles comprising a free-flowing, distributable mass of discrete, pressure-moldable abrasive granules, a majority of the individual abrasive granules being substantially coated with a finely divided ceramic bonding material which is adhered to the abrasive granules by a temporary binder consisting of a thermoplastic resinous material as distinguished from and exclusive of thermosetting resinous materials, a plasticizer and an organic solvent, said thermoplastic resinous material being selected from the group consisting of thermoplastic resinous derivatives of rosin, thermoplastic coumar and indene resins, and bitumens.

7. A non-aqueous composition for molding ceramic bonded abrasive articles according to claim 6, in which the temporary binder also contains a thermosetting resin.

8. A composition for molding ceramic bonded articles comprising a distributable mass of pressure-moldable granules in which each of a majority of the individual granules comprises a non-plastic, inorganic granular nucleus largely surrounded by particles of pulverized ceramic bonding material attached to the nucleus by an organic temporary binder consisting of a resinous rosin derivative, a coumarone-indene resin, and a pine oil solvent.

9. A method of making ceramic bonded articles comprising mixing granular material and finely divided ceramic bonding material with a non-aqueous temporary binder consisting of an organic resinous plasticizing agent which is stable and non-volatile under normal atmospheric conditions and plastic during the early stages of drying, and a solvent to form a pressure-sensitive, distributable mass, placing the resulting mass in a mold and pressing to form an article of the desired shape, subjecting the molded shape to low temperatures to drive off the solvent while the plasticizing agent maintains the article in a plastic condition, and subsequently heating at higher temperatures to drive off the balance of the temporary binder and mature the ceramic bond.

10. A method of making ceramic bonded articles comprising mixing granular material and finely divided ceramic bonding material with a temporary binder consisting of a thermoplastic resin, a heat-hardenable resin and a solvent to form a pressure-sensitive, distributable mass, placing the resulting mass in a mold and pressing to form an article of the desired shape, subjecting the molded shape to temperatures to drive off the solvent while the plasticizing agent maintains the article in a plastic condition, and subsequently heating at higher temperatures to drive off the balance of the temporary binder and mature the ceramic bond.

11. A method of making ceramic bonded articles comprising mixing granular material and finely divided ceramic bonding material with a temporary binder consisting of a resinous rosin derivative, a phenolic resin and pine oil to form a pressure-sensitive, distributable mass, placing the resulting mass in a mold and pressing to form an article of the desired shape, subjecting the molded shape to temperatures to drive off the solvent while the plasticizing agent maintains the article in a plastic condition, and subsequently heating at higher temperatures to drive off the balance of the temporary binder and mature the ceramic bond.

12. A method of making ceramic bonded articles comprising mixing granular material and finely divided ceramic bonding material with a non-aqueous temporary binder consisting of an organic resinous plasticizing agent which is stable and non-volatile under normal atmospheric conditions and plastic during early stages of drying, and a solvent to form a pressure-sensitive mass, heating the resulting mass to drive off a portion of the solvent and thereby partially dry the mass of material, screening the partially dried material through a coarse mesh screen to form a moldable mixture composed of discrete granular particles of pressure-sensitive character, placing the resulting material in a mold and pressing to form an article of the desired shape, and heating at higher temperature to drive off the balance of the temporary binder and mature the ceramic bond.

13. A method of making ceramic bonded articles comprising mixing granular material and finely divided ceramic bonding material with a temporary binder consisting of a thermoplastic resinous rosin derivative and pine oil to form a pressure-sensitive mass, heating the resulting mass to drive off a portion of the pine oil and thereby partially dry the mass of material, screening the partially dried material through a coarse mesh screen to form a moldable mixture composed of discrete granular particles of pressure-sensitive character, placing the resulting material in a mold and, pressing to form an article of the desired shape, and heating at higher temperature to drive off the balance of the temporary binder and mature the ceramic bond.

14. A method of making ceramic bonded articles comprising mixing granular material and finely divided ceramic bonding material with a temporary binder consisting of a thermoplastic resinous rosin derivative, a heat-hardenable phenolic resin, and pine oil, to form a pressure-sensitive mass, heating the resulting mass to drive off a portion of the pine oil and thereby partially dry the mass of material, screening the partially dried material through a coarse mesh screen to form a moldable mixture composed of discrete granular particles of pressure-sensitive character, placing the resulting material in a mold and pressing to form an article of the desired shape, and heating at higher temperatures to drive off the balance of the temporary binder and mature the ceramic bond.

WALTER L. WALLACE.
NORMAN P. ROBIE.

REFERENCES CITED

The following references are of record in the file of this patent:

UNITED STATES PATENTS

| Number | Name | Date |
| --- | --- | --- |
| 1,453,726 | Prouty | May 1, 1923 |
| 1,458,376 | Anderson | June 12, 1923 |
| 1,548,146 | Keever | Aug. 4, 1925 |
| 1,847,102 | Scott | Mar. 1, 1932 |
| 1,910,444 | Nicholson | May 23, 1933 |
| 1,956,905 | Merriam | May 1, 1934 |
| 1,977,698 | Scott | Oct. 23, 1934 |
| 2,061,931 | Benner et al. | Nov. 24, 1936 |
| 2,117,970 | Merriam | May 17, 1938 |
| 2,122,960 | Schwartzwalder | July 5, 1938 |
| 2,132,005 | Milligan et al. | Oct. 4, 1938 |
| 2,150,034 | Melton et al. | Mar. 7, 1939 |
| 2,158,034 | Milligan et al. | May 9, 1939 |
| 2,201,321 | Robie | May 21, 1940 |
| 2,288,047 | Sullivan et al. | June 30, 1942 |
| 2,342,121 | Ciell | Feb. 22, 1944 |
| 2,363,146 | Robie | Nov. 21, 1944 |